(12) United States Patent
Dufour

(10) Patent No.: US 7,010,210 B2
(45) Date of Patent: Mar. 7, 2006

(54) ENTRY AND INTERNAL FIBER CLIPS FOR A FIBER MANAGEMENT SYSTEM

(75) Inventor: Robin Dufour, Lachine (CA)

(73) Assignee: Nortel Networks Limited, St. Laurent (CA)

( * ) Notice: Subject to any disclaimer, the term of this patent is extended or adjusted under 35 U.S.C. 154(b) by 233 days.

(21) Appl. No.: 10/445,685

(22) Filed: May 27, 2003

(65) Prior Publication Data

US 2003/0235387 A1 Dec. 25, 2003

Related U.S. Application Data

(60) Provisional application No. 60/390,868, filed on Jun. 21, 2002.

(51) Int. Cl.
*G02B 6/00* (2006.01)

(52) U.S. Cl. ............... 385/136; 385/134; 385/135; 385/137

(58) Field of Classification Search ........ 385/134–137, 385/147
See application file for complete search history.

(56) References Cited

U.S. PATENT DOCUMENTS

| | | | |
|---|---|---|---|
| 6,209,827 B1 * | 4/2001 | Kawai ................... 248/73 |
| 6,363,198 B1 * | 3/2002 | Braga et al. ........... 385/134 |
| 6,539,161 B1 | 3/2003 | Holman et al. |
| 6,612,525 B1 * | 9/2003 | Bagdi ..................... 248/71 |
| 6,636,679 B1 * | 10/2003 | Mereness ................ 385/136 |
| 6,665,484 B1 * | 12/2003 | Douglas et al. ........ 385/136 |
| 6,669,149 B1 * | 12/2003 | Akizuki .................. 248/71 |
| 6,671,447 B1 * | 12/2003 | Gehrke ................... 385/135 |
| 6,771,871 B1 * | 8/2004 | Krampotich et al. ... 385/134 |
| 6,850,687 B1 * | 2/2005 | Lavoie .................... 385/137 |

FOREIGN PATENT DOCUMENTS

| | | |
|---|---|---|
| DE | 33 12 847 A | 10/1984 |
| GB | 688 047 A | 2/1953 |

* cited by examiner

*Primary Examiner*—John D. Lee
*Assistant Examiner*—Kevin S. Wood
(74) *Attorney, Agent, or Firm*—Guerin & Rodriguez, LLP; Michael A. Rodriguez

(57) ABSTRACT

Described is a fiber management system having an internal fiber clip for segregating fiber optic cables in the enclosure and an entry fiber clip for guiding fiber optic cables bundled by the internal fiber clip to a telecommunications system external to the enclosure. The internal fiber clip includes a fiber guide portion and a locking mechanism connected to one end of the fiber guide portion for attaching the internal fiber clip to a wall of the enclosure. The locking mechanism has a resilient fin and a stem with a tab. The tab and the resilient fin both extend laterally away from the stem. The resilient fin urges against a first side of the wall and the tab is urged against an opposite side of the wall when the internal fiber clip is rotated with the tab fully inserted through an opening in the wall.

15 Claims, 17 Drawing Sheets

ENTRY AND INTERNAL FIBER CLIPS FOR A FIBER MANAGEMENT SYSTEM

RELATED APPLICATIONS

This application claims the benefit of the filing date of U.S. Provisional Application, Ser. No. 60/390,868, filed Jun. 21, 2002, titled "Method and Apparatus for Fiber Management," the entirety of which provisional application is incorporated by reference herein.

FIELD OF THE INVENTION

The invention relates generally to optical telecommunications systems. More particularly, the invention relates to a system for managing fiber optic cables in a fiber management system.

BACKGROUND

In telecommunications, fiber optic cables are becoming a popular alternative to the traditional copper wire for transmitting signals. The fiber optic cables used in optical telecommunications systems in an optical network can be numerous and thus require careful management. Industry has produced a variety of fiber optic cable managers, such as fiber optic organizers, junction boxes, closets and cabinets for this purpose. Used often within such enclosures, fiber clips provide a way of grouping and segregating fiber optic cables. An important feature of such fiber clips is that they can control the amount of bending by the fiber optic cable. Excessive bending can induce optical losses in the fiber optic cables or promote fiber optic cable fractures, rendering such cables inoperable for transmitting optical signals.

Some fiber clips, because of their design and construction, do not remain attached to enclosure walls, and other fiber clips fail to stay closed and hold the fiber optic cables. These shortcomings can produce a jumble of dangling fiber optic cables within the enclosure and jeopardize the integrity of the fiber optic cables. Thus there remains a need for a fiber management system with fiber optic cable clips that can be used in for guiding fiber optic cables to, from and through a fiber optic enclosure without the disadvantages of the above-described systems.

SUMMARY

In one aspect, the invention features a fiber management system having an enclosure. The fiber management system comprises an internal fiber clip including a fiber guide portion for bundling a plurality of fiber optic cables and a locking mechanism connected to one end of the fiber guide portion for attaching the internal fiber clip to a first wall of the enclosure. The locking mechanism has a stem and a resilient fin extending laterally away from the stem. The stem has a tab near one end of the stem and extends laterally away from the stem. The tab is spatially separated from an end of the resilient fin such that i) the end of the resilient fin presses against a first side of the first wall when the tab is fully inserted through a first opening in the first wall and ii) the tab is urged against an opposite side of the first wall when the internal fiber clip is rotated while the tab is fully inserted and the end of the resilient fin is pressing against a first side of the first wall. The fiber management system also has an entry fiber clip attached to an edge of an external wall of the enclosure for guiding at least one of the plurality of fiber optic cables bundled by the internal fiber clip to a telecommunications system external to the enclosure.

In another aspect, the invention features a fiber management system having an enclosure. The fiber management system comprises an internal fiber clip for segregating a plurality of fiber optic cables from other fiber optic cables in the enclosure and an entry fiber clip attached to an edge of an external wall of the enclosure for guiding at least one of the plurality of fiber optic cables segregated by the internal fiber clip to a telecommunications system external to the enclosure. The entry fiber clip includes a fiber guide portion that has first and second spaced-apart side walls and a base portion. The first side wall has a catch on an outer surface thereof. The catch has a sloped surface and a front surface that define a lip. The entry fiber clip also includes a door locking mechanism having a door with a first end and a second end. The door is rotatably connected at the first end to a latch mechanism having an opening formed therein. The opening lies in a plane that is substantially perpendicular to a plane of the door. The door is rotatably connected at the second end to the second side wall for rotational movement about an axis between an open position and a closed position. The opening of the latch mechanism receives the lip of the catch when the door is rotated into the closed position.

In yet another aspect, the invention features a fiber management system having an enclosure and comprising an internal fiber clip for segregating a plurality of fiber optic cables from other fiber optic cables in the enclosure. The fiber management system also has an entry fiber clip that guides at least one of the plurality of fiber optic cables segregated by the internal fiber clip to a telecommunications system external to the enclosure. The entry fiber clip includes a fiber guide portion having first and second spaced-apart side walls and a base portion. The fiber guide portion has a plunger extending substantially perpendicularly away from an exterior side of the base portion. The plunger has a shaft for entering into an opening in an external wall of the enclosure and a hook at the end of the shaft for latching onto a back edge of the opening to attach the entry fiber clip to the external wall.

The invention also features an internal fiber clip for segregating and guiding fiber optic cable in an enclosure of a fiber management system. The internal fiber clip comprises a fiber guide portion for bundling a plurality of fiber optic cables and a locking mechanism connected to one side of the base portion for attaching the internal fiber clip to a wall of the enclosure. The fiber guide portion has a base portion. The locking mechanism has a stem and a resilient fin extending laterally away from the stem. The stem has a tab near one end of the stem and extending laterally away from the stem. The tab is spatially separated from an end of the resilient fin such that i) the end of the resilient fin presses against a first side of the wall when the tab is fully inserted through a first opening in the first wall and ii) the tab is urged against an opposite side of the wall when the internal fiber clip is rotated while the tab is fully inserted and the end of the resilient fin is pressing against a first side of the wall.

The invention also features an entry fiber clip for guiding fiber optic cable between an enclosure and a telecommunications system. The entry fiber clip comprises a fiber guide portion having first and second spaced-apart side walls and a base portion. The first side wall has a catch on an outer surface thereof. The catch has a sloped surface and a front surface that define a lip. The entry fiber clip also includes a door locking mechanism having a door with a first end and a second end. The door is rotatably connected at the first end to a latch mechanism having an opening formed therein. The opening lies in a plane that is substantially perpendicular to a plane of the door. The door is rotatably connected at the second end to the second side wall for rotational movement about an axis between an open position and a closed position. The opening of the latch mechanism receives the lip of the catch when the door is rotated into the closed position.

In still another aspect, the invention features an entry fiber clip for guiding optical fiber cable in an optical fiber management system. The entry fiber clip comprises a fiber guide portion having first and second spaced-apart side walls and a base portion. The fiber guide portion has a plunger extending substantially perpendicularly away from an exterior side of the base portion. The plunger has a shaft and a hook at the end of the shaft for latching onto a back edge of an opening in an external wall of the enclosure when attaching the entry fiber clip to the external wall.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention provides a mechanism within a fiber optic cable management system, such as may be used in a telecommunications central office, for collecting and guiding fiber optic cable to and from and through an enclosure (e.g., a "wiring" closet or cabinet). The mechanism includes internal and entry fiber optic cable clips with improved capabilities for holding fiber optic cables and for attaching to enclosure walls.

Figure 1:
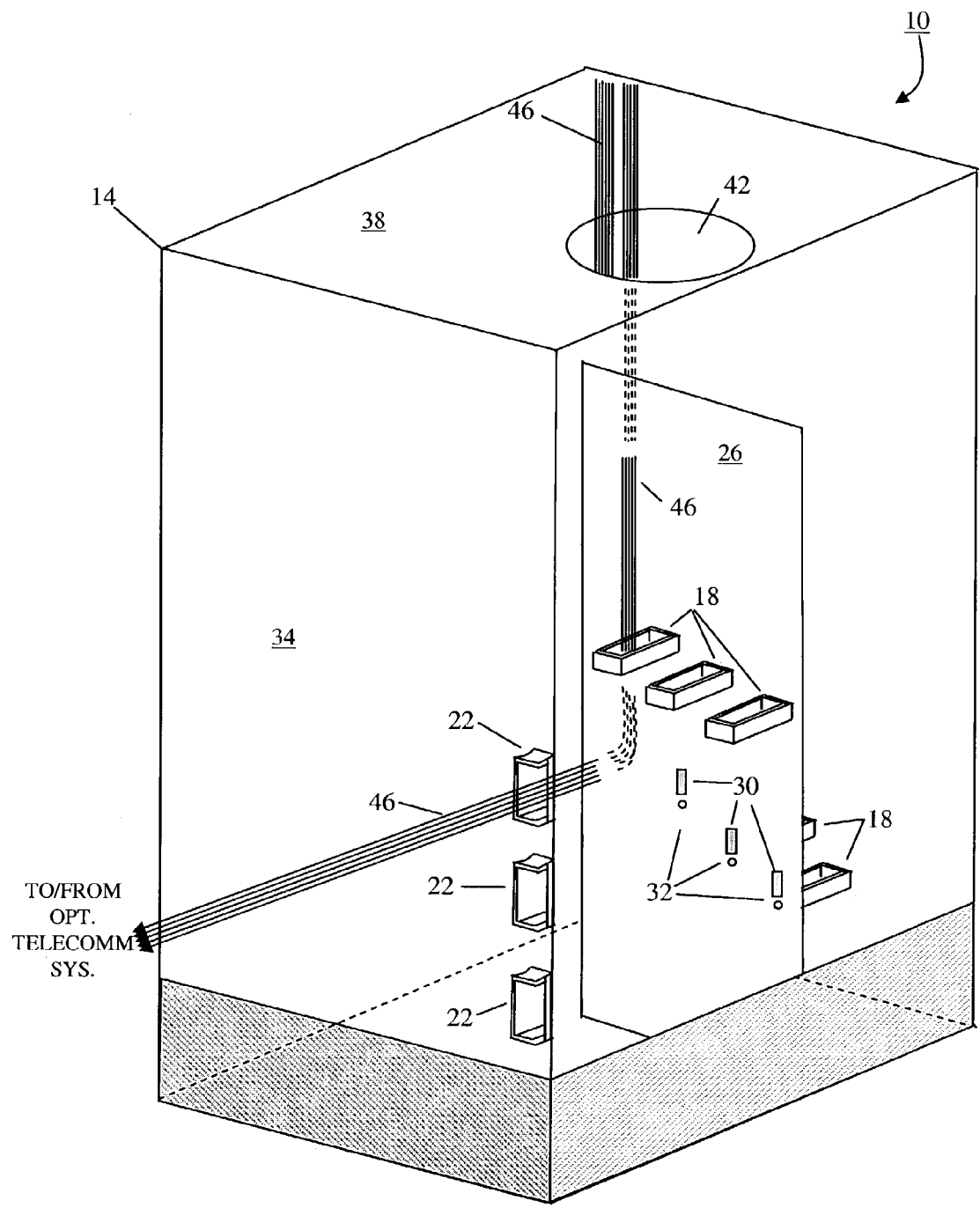
FIG. 1 is a view of a fiber management system 2 constructed in accordance with the invention, the fiber management system including an enclosure, a plurality of internal fiber clips and a plurality of entry fiber clips.

FIG. 1 shows an embodiment of a fiber management system 10 for segregating and guiding fiber optic cables from overhead (i.e., a ceiling) or from sub-floor trays to individual port cards located on an adjacent optical telecommunications system, e.g., a switch (not shown). The fiber optic cables carry light signals, representing voice and data, from transmitter devices to receiver devices. Generally, the optical telecommunications system converts light signals into electrical signals and electrical signals into light signals, although the particular operation of the telecommunication system is not essential to the practice of the principles of the invention.

The fiber management system 10 of the invention includes an enclosure 14, a plurality of internal fiber clips 18, and a plurality of entry fiber clips 22. In one embodiment, the enclosure 14 is a housing constructed of sheet metal (e.g., two feet wide, by two feet deep, by six feet high) with a door that provides user access to the fiber optic cables passing therethrough.

Hundreds of fiber optic cables may pass through the enclosure 14. To transmit light signals effectively, the internal and entry fiber clips 18, 22 guide these fiber optic cables to their appropriate port locations on the adjacent telecommunications system without kinking, damaging, fracturing, or breaking the fiber optic cables. In the fiber management system 10, the internal and entry fiber clips 18, 22 segregate the fiber optic cables into groups.

The number of internal and entry fiber clips 18, 22 shown in FIG. 1 are exemplary. Typically, the fiber management system 10 includes more internal and entry fiber clips 18, 22 than those shown. The number of fiber clips 18, 22 used in the enclosure 14 depends on the number of fiber optic cables routed through the enclosure 14, the size of the fiber optic cables, and the fiber capacity of each type of fiber clip 18, 22. For example, to handle 500 fiber optic cables, the fiber management system 10 can have a plurality of internal fiber clips 18 attached to most or all of the inside walls 26 of the enclosure 14. Also, in some embodiments, a column of twenty to twenty-five entry fiber clips 22 are attached at an edge of an enclosure side wall 34, which is given reference numeral 34 to distinguish the enclosure side wall 34 from the other walls 26 of the enclosure 14.

In accordance with the principles of the invention, the walls 26 of the enclosure 14 that support internal fiber clips 18 have a plurality of openings 30, 32. Each opening 30, 32 is appropriately sized to receive a particular respective portion of the internal fiber clip 18, as described in more detail below, and to secure the internal fiber clip 18 to the wall 26. The enclosure side wall 34 has an opening (not shown) appropriately sized to receive a portion of an entry fiber clip 22 to secure that clip 22 to the side wall 34.

In the illustrated embodiment, the enclosure 14 includes a top panel 38 with an opening 42 therein for the passage of fiber optic cables 46. The fiber optic cables 46 extend from the ceiling of a room into the enclosure 14 through the opening 42. Within the enclosure 14, the fiber optic cables 46 extend through the plurality of internal fiber clips 18 and through a plurality of entry fiber clips 22 to the adjacent optical telecommunications system.

Figure 2:
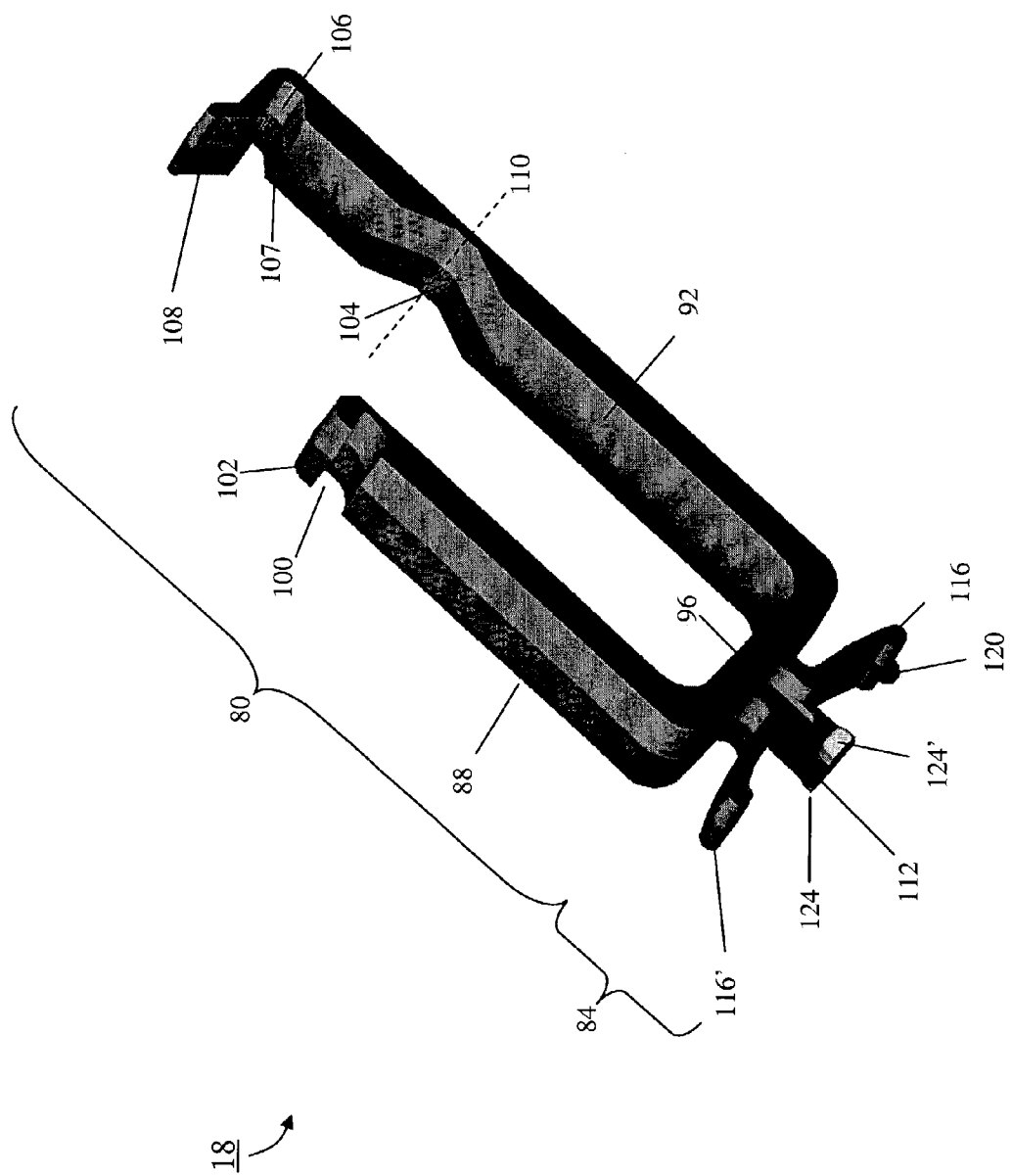
FIG. 2 is view of an embodiment of an internal fiber clip of the invention.

FIG. 2 shows an embodiment of the internal fiber clip 18 having a U-shaped fiber guide 80 and a locking mechanism 84. The internal fiber clip 18 is constructed of an integral piece of resilient material, preferably Nylon 6/6, using a standard manufacturing technique, such as injection molding. Material such as Nylon 6/6, although resilient, is sufficiently rigid to keep the internal fiber clip 18 from becoming unlocked or detached from the wall 26. The U-shaped fiber guide 80 has spatially separated parallel arms 88 and 92. The arms 88, 92 are connected to each other at one end by a base 96 (i.e., the base of the U-shape). Preferably, the thicknesses of the arms 88, 92 and base 96 are approximately 0.080" (inches). Such thicknesses contribute also to the rigidity of the internal fiber clip 18 and thus reduce any likelihood of the clip 18 inadvertently becoming unlocked or detached from the wall 26.

Figure 3:
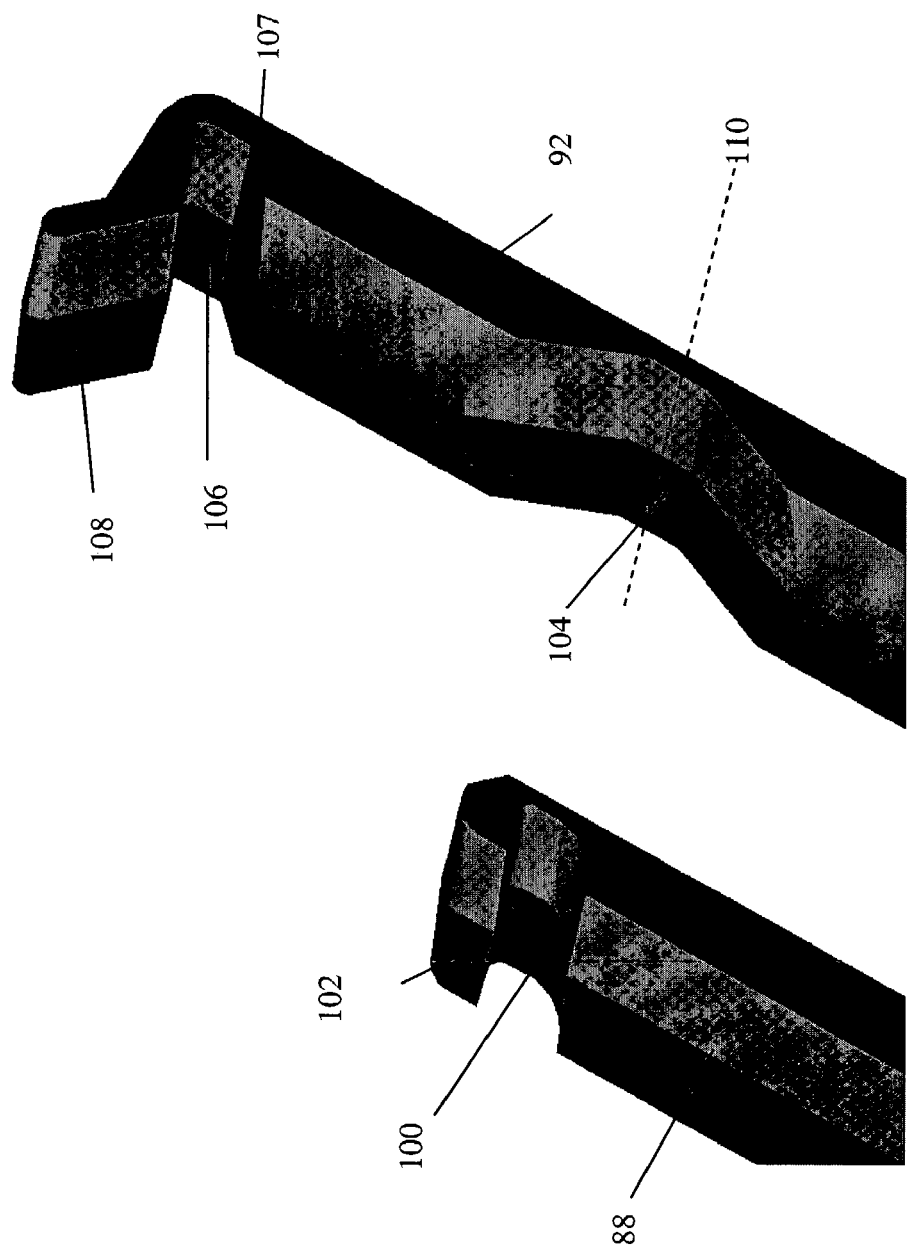
FIG. 3 is a view of a fiber guide portion of the internal fiber clip of FIG. 2.

Referring to FIG. 2 and FIG. 3, at the other end of the arm 88, i.e., the end that is not connected to the base 96, is a back-slanted U-shaped notch 100 for receiving a latch. The notch 100 extends the width of the arm 88 and forms an end portion 102 at the end of the arm 88. The end portion 102 is sized to fit closely in a notch 106 in the arm 92, as described below.

The arm 92 has a resilient "living" hinge 104, a U-shaped notch 106 with a sloped side wall 107, and a latch portion 108 at the end of the arm 92 farther from the base 96. The hinge 104 permits the arm 92 to bend resiliently towards the arm 88 about an axis 110. The arm 92 is longer than the arm 88 from approximately the center of the living hinge 104 to the end of the latch portion 108. This length difference produces a locking engagement between the arms 88, 92 when the living hinge 104 is bent sufficiently to cause the latch 108 of the arm 92 to enter the notch 100 in the arm 88 and the end portion 102 of the arm 88 to enter the notch 106 of the arm 92. The locking engagement produces a substantially rectangular ring within which to bundle a plurality of fiber optic cables.

Figure 4:
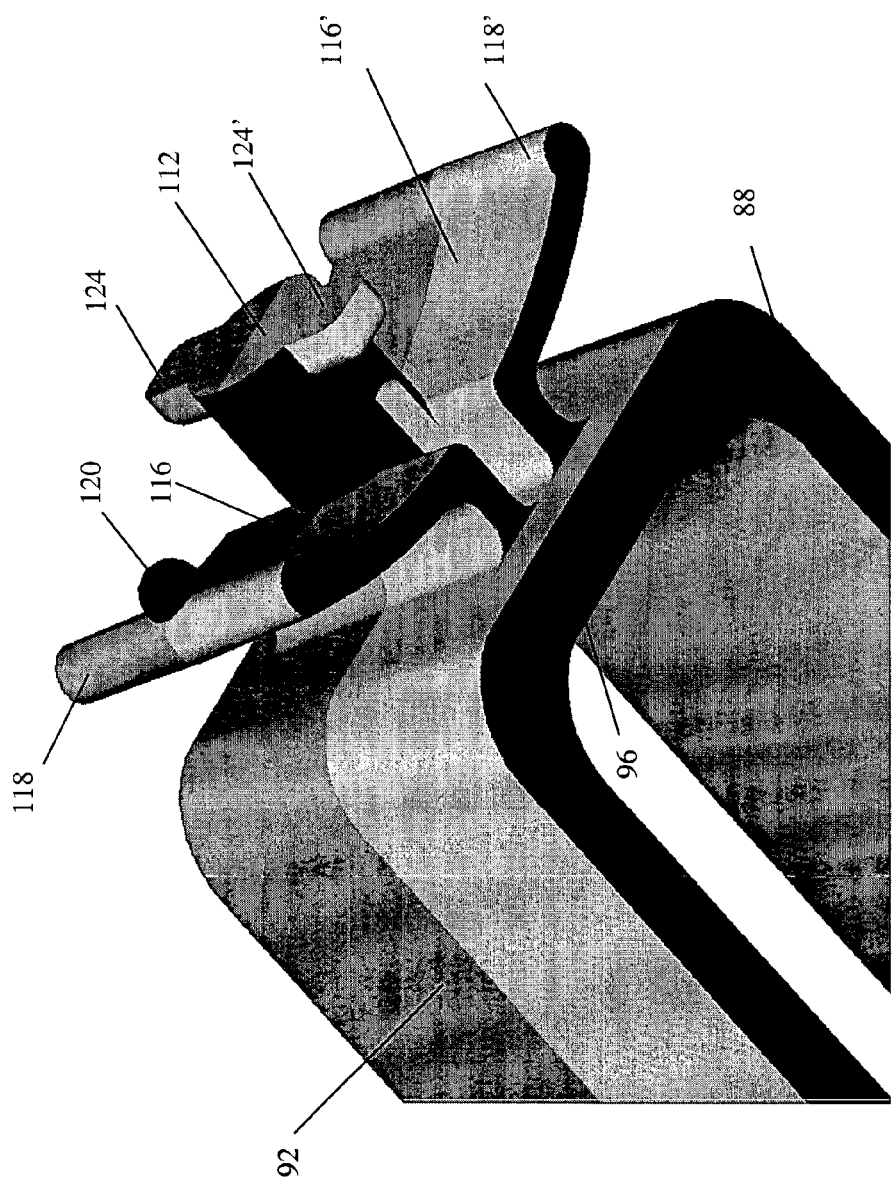
FIG. 4 is a view of a locking mechanism of the internal fiber clip.
Figure 5:
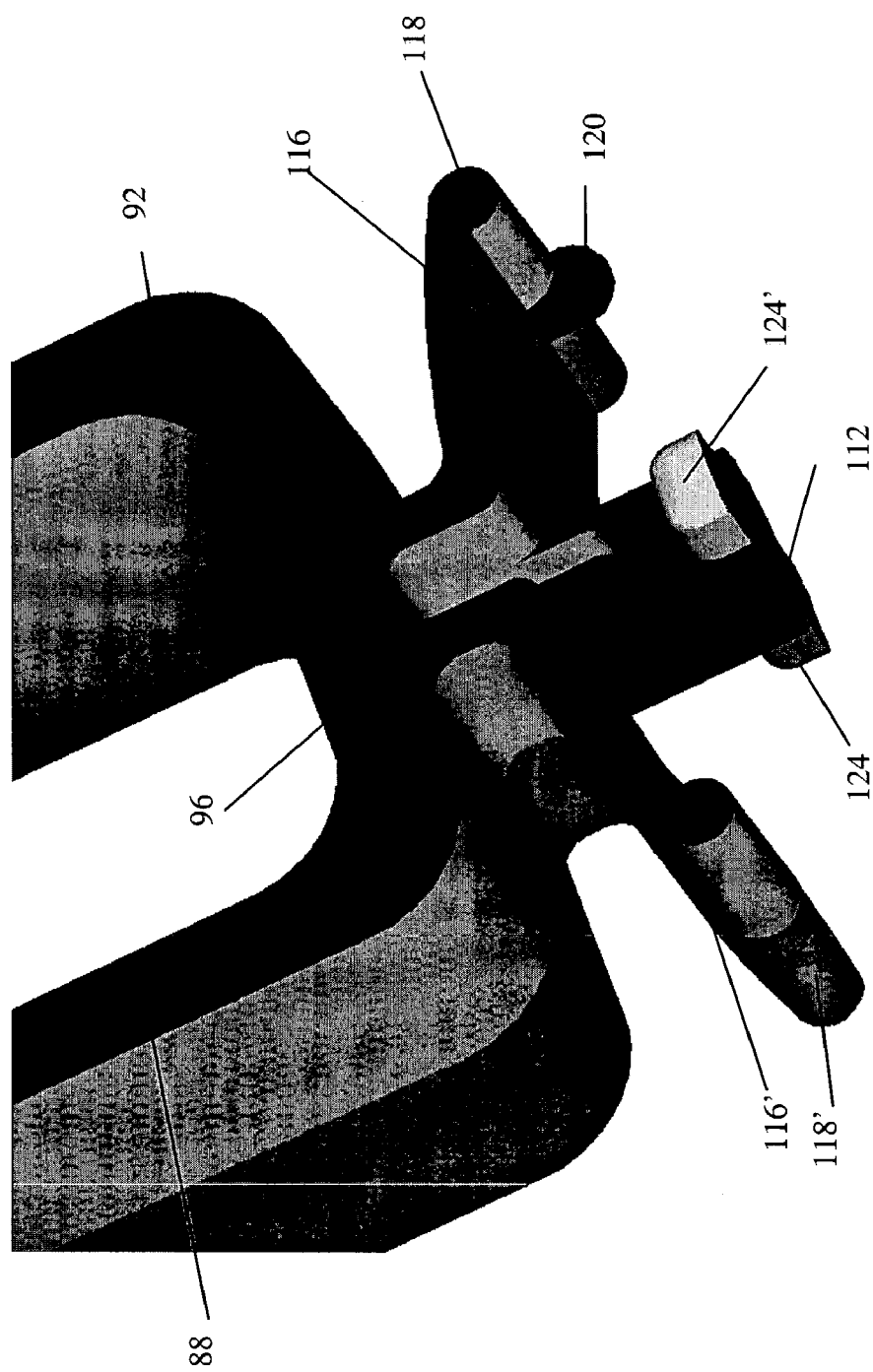
FIG. 5 is another view of the locking mechanism of the internal fiber clip.

Referring now to FIG. 2, FIG. 4, and FIG. 5, the locking mechanism 84 is connected approximately midway to a back side of the base 96, i.e., the side that is external to the U-shape of the fiber guide portion 80. The locking mechanism 84 includes a stem 112 and a pair of spaced-apart, resilient springs or fins 116, 116'. The stem 112 is generally cylindrical in shape and extends substantially perpendicularly from the base 96 for a predetermined length. At one end of the stem 112 (i.e., the end not connected to the base 96), spaced-apart tabs 124, 124' perpendicularly extend away from the stem 112. The tabs 124, 124' are on directly opposite sides of the stem 112 and are separated from each other by the diameter of the stem 112. Each tab 124, 124' has a front side (shown here to be flush with the end of the stem 112), a back side, and a predetermined thickness.

The fins 116, 116' are on directly opposite sides of the stem 112, separated from each other by the diameter of the stem 112. From the base 96, each fin 116, 116' extends away substantially perpendicularly and then spreads out laterally away from the stem 112, like a flower petal. The fins 116, 116' extend away from the stem 112 in a direction that is substantially perpendicular to the direction of the extension of the tabs 124, 124'. To illustrate using the points of a clock, if the tab 124 points in the direction of 12 o'clock, the fin 116' points to 3 o'clock, the tab 124' points to 6 o'clock, and the fin 116 points to 9 o'clock.

The end of each fin 116, 116' has a width-wise cylindrical shape 118, 118', respectively. One of the resilient fins (here, fin 116) has a pin ball 120 extending out of the cylindrical shape 118. The pin ball 120 extends away from the cylindrical shape 118 substantially parallel to the stem 112. The distance of the tip of the pin ball 120 from the base 96 is approximately the same as the distance of the back side of each tab 124, 124' from the base 96.

Note that other embodiments of the locking mechanism 84 have only one tab, only one fin (the one with the pin ball 120), or both only one tab and only one fin.

Figure 6A:
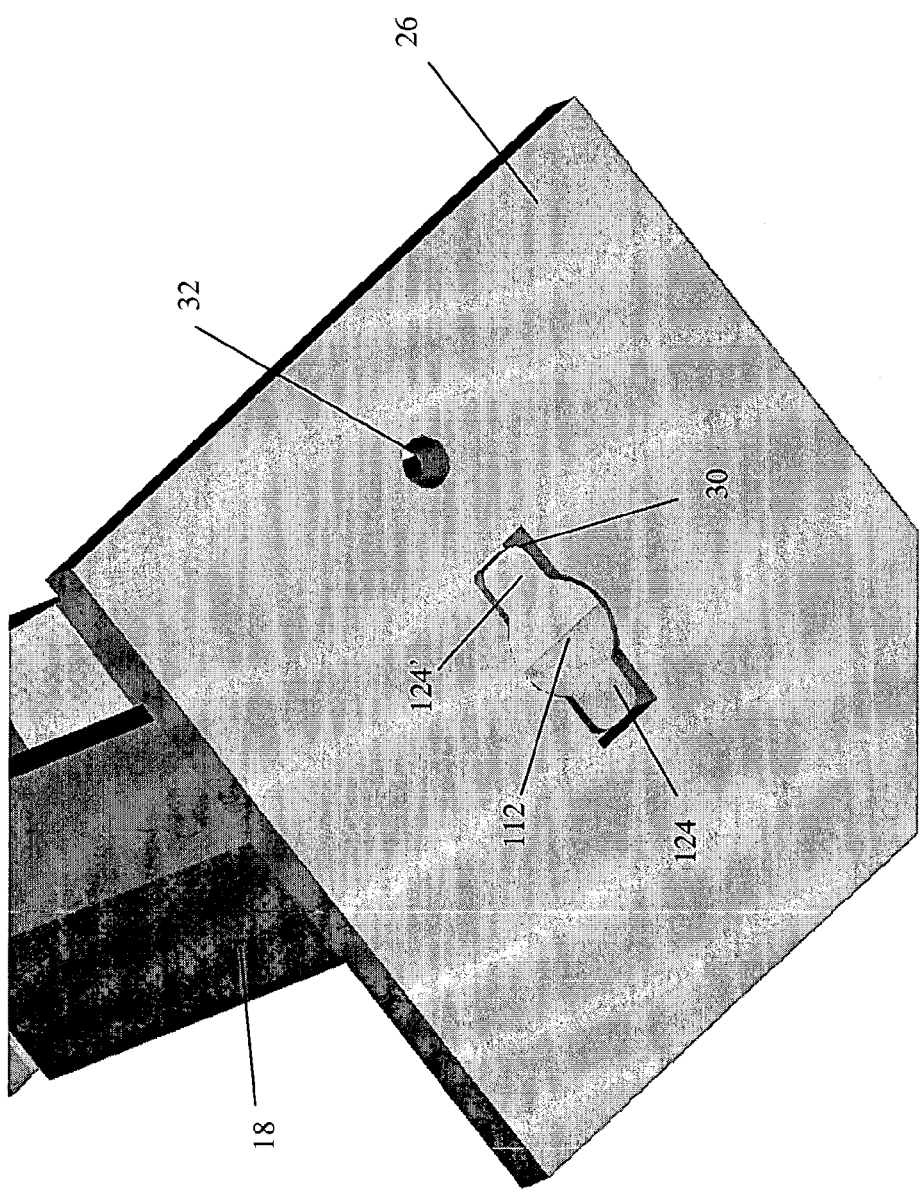
FIG. 6A is a view of the locking mechanism positioned to enter an opening in a wall of the fiber management system, as seen from a side of the wall opposite the internal fiber clip.
Figure 6B:
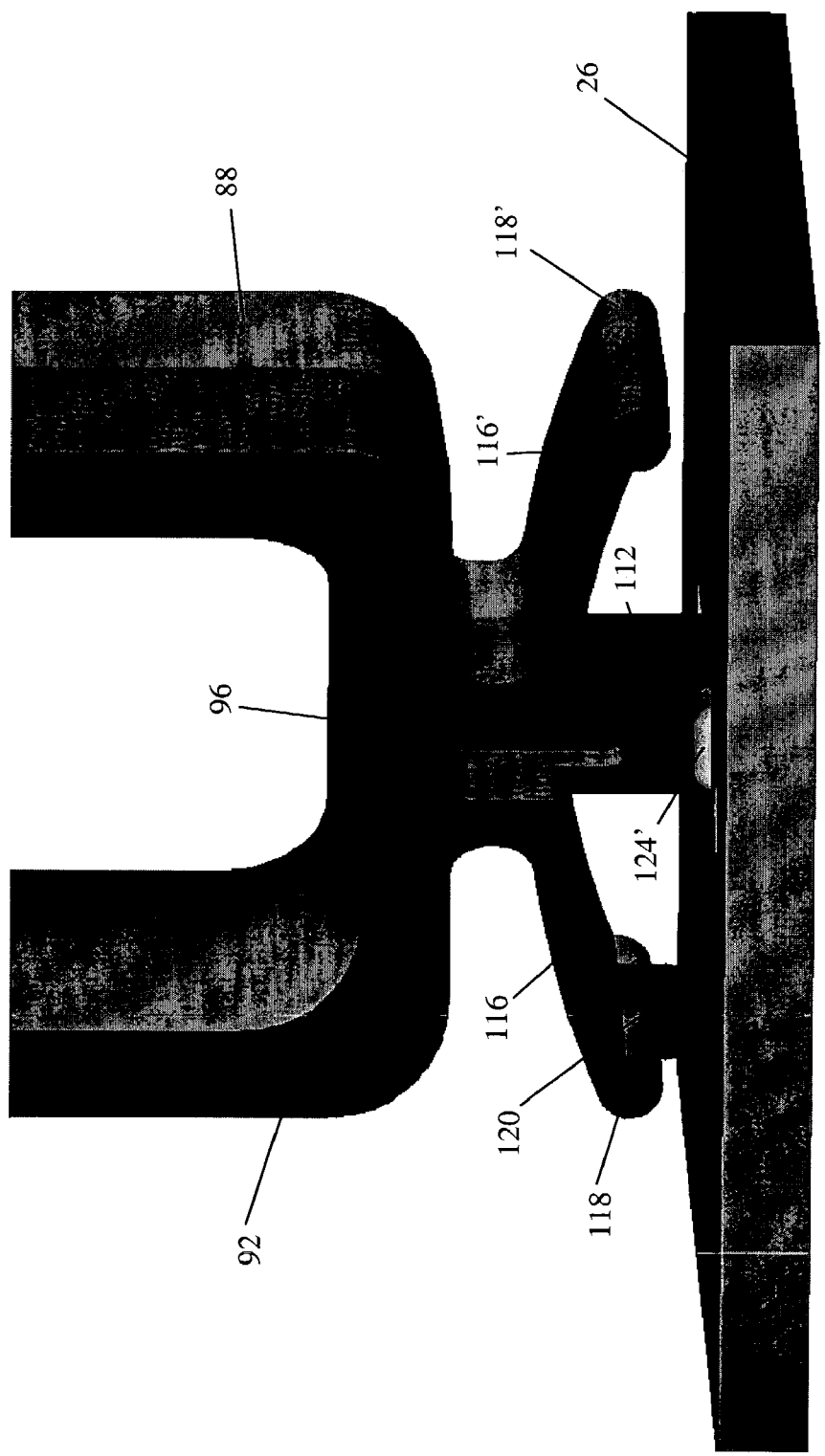
FIG. 6B is a view of the locking mechanism positioned to enter an opening in a wall of the fiber management system, as seen from the side of the wall with the internal fiber clip.

FIG. 6A, FIG. 6B, FIG. 6C, and FIG. 6D together illustrate a process of attaching the internal fiber clip 18 to one of the walls 26 of the fiber management system 10. FIG. 6A shows the internal fiber clip 18 being positioned within one of the openings 30 (FIG. 1) in the wall 26. The opening 30 has a circular portion that is sized to receive closely the stem 112 and rectangular portions that are each sized to receive closely a respective one of the tabs 124, 124'. The wall 26 has another circular opening 32 aligned with one end of the opening 30. This circular opening 32 is sized to receive the pin ball 120 (FIG. 2) of the internal fiber clip 18. In FIG. 6A, the pinball 120 is not seen because, being approximately perpendicular to the tabs 124, 124', it is not yet aligned with the circular opening 32. FIG. 6B shows a side view of the resilient fins 116, 116', the pin ball 120, and the tab 124' before the tabs 124, 124' have become fully inserted into the opening. As shown, the pin ball 120 at the end of the resilient fin 116 is in contact the surface of the wall 26.

With the stem 112 and tabs 124, 124' aligned within the opening 30, force is applied to the internal fiber clip 18 to push the stem 112 and the tabs 124, 124' further through the opening 30. This force presses the resilient fins 116, 116' (and the pin ball 120 at the end of fin 116) against the opposite side of the wall 26 and produces tension in the fins 116, 116'.

Figure 6C:
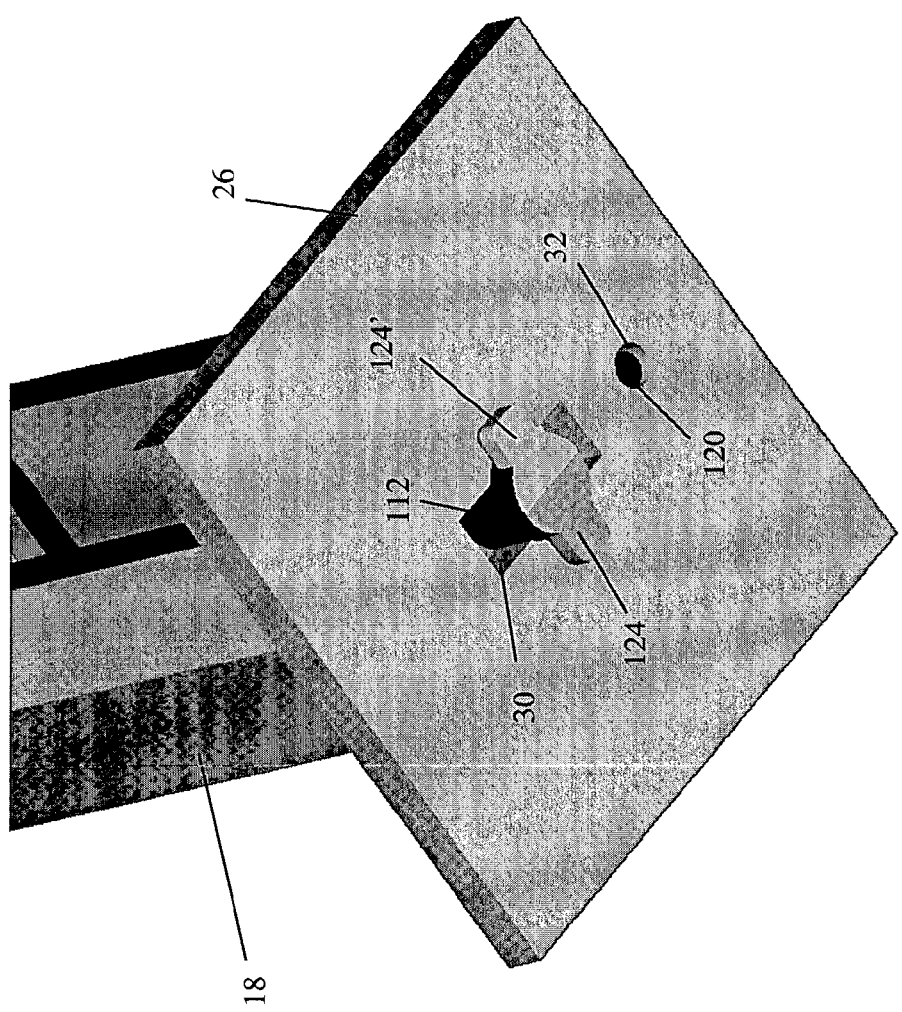
FIG. 6C is a view of the locking mechanism rotated and locked into position in the opening of the wall, as seen from the side of the wall opposite the internal fiber clip.
Figure 6D:
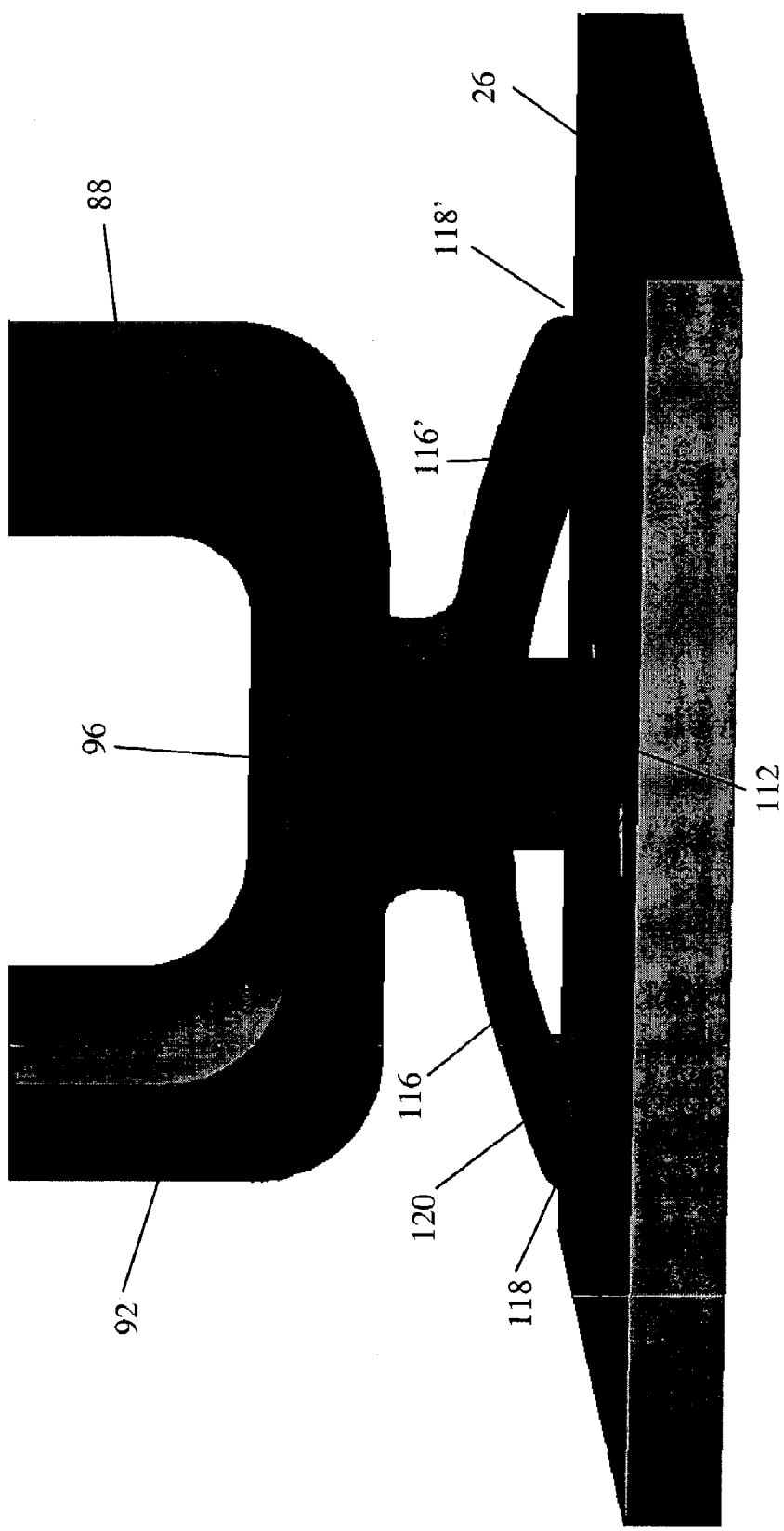
FIG. 6D is a view of the locking mechanism rotated and locked into position in the opening of the wall, as seen from the side of the wall with the internal fiber clip.

When the tabs 124, 124' are completely through the opening 30 (i.e., the back sides of the tabs 124, 124' are beyond the plane of the wall 26), the internal fiber clip 18 is rotated until the pin ball 120 aligns with the opening 32. The tension on the fins 116, 116' causes the pin ball 120 to snap into the opening 32. FIG. 6C and FIG. 6D show the resulting position of the various portions of the internal fiber clip 18 within the openings 30 and 32 from different perspectives on opposite sides of the wall 26.

The insertion of the pin ball 120 into the opening 32 releases some, but not all, of the tension in the fins 116, 116'. The remaining tension in the fins 116, 116' operates to push the fins 116, 116' against one side of the wall 26, to maintain the pin ball 120 in the opening 32. The pushing of the fins 116, 116' against the wall 26 also urges the tabs 124, 124' against the opposite side of the wall 26. Thus, the internal fiber clip 18 is held firmly in place between the fins 116, 116' and the tabs 124, 124'. In one embodiment, the opening 32 on the wall 26 is aligned immediately below the opening 30, and the effect of gravity on the internal fiber clip 18 operates to urge the pin ball 120 into the opening 32. Being thus secured within the opening 32, the pin ball 120 prevents the internal fiber clip 18 from rotating when attached to the wall 26.

Figure 7:
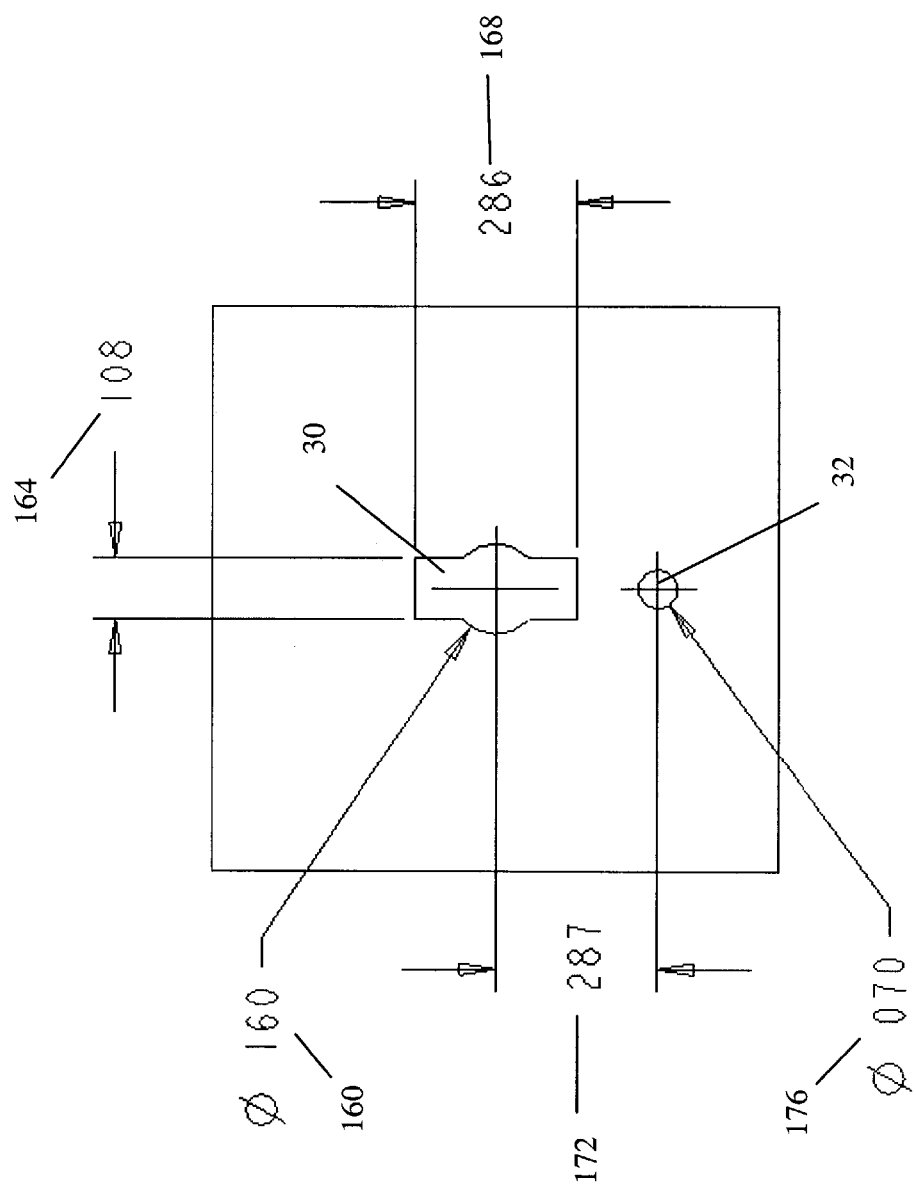
FIG. 7 is a schematic diagram of a cut-out for the wall including measurements for dimensions of the openings in the wall for receiving the internal fiber clip of the invention.

FIG. 7 shows examples of dimensions 160, 164, 168, 172 and 176 for sizes and positions of the openings 30, 32 in the wall 26 for receiving the stem 112, tabs 124, 124' and pin ball 120 of the internal fiber clip 18. The values shown for each of the dimensions are in inches. The dimension 160 corresponds to the diameter of the circular portion of the opening 30 for closely receiving the stem 112; the dimension 164 corresponds to a width of the rectangular portions of the opening 30 for closely receiving the tabs 124, 124'; the dimension 168 corresponds to the length of the opening 30 from the end of one rectangular portion to the end of the other rectangular portion; the dimension 172 corresponds to a distance from the center of the circular portion of the opening 30 to the center of the opening 32; and the dimension 176 corresponds to the diameter of the opening 32.

Figure 8:
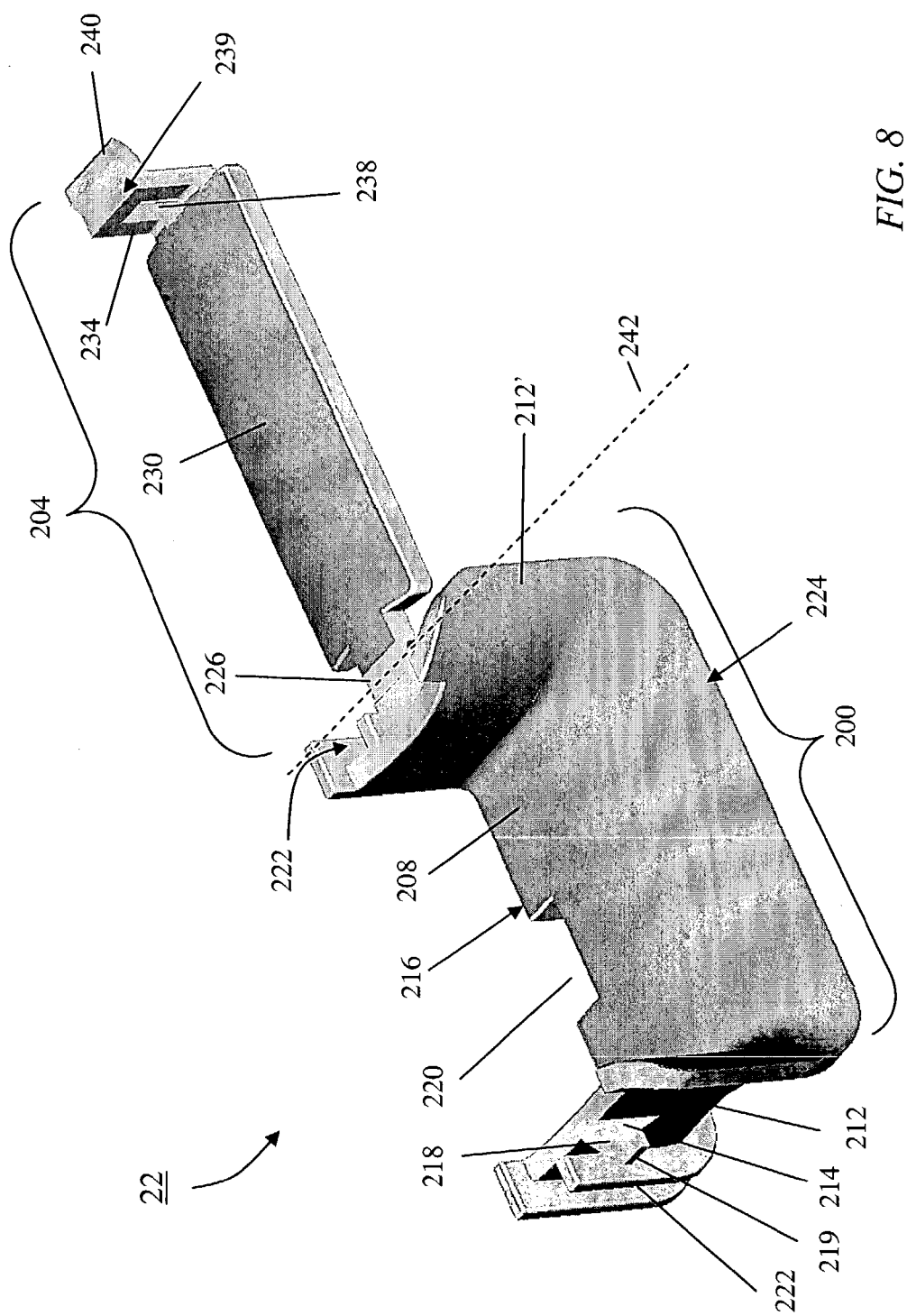
FIG. 8 is a view of an embodiment of an entry fiber clip having a door locking mechanism and a fiber guide.

FIG. 8 shows an embodiment of the entry fiber clip 22 (FIG. 1) having a U-shaped fiber guide portion 200 and a door locking mechanism 204. The entry fiber clip 22 is constructed of an integral piece of resilient material, preferably Nylon 6/6, using a standard manufacturing technique such as injection molding. As described above, Nylon 6/6 gives the entry fiber clip 22 a sufficiently rigid structure to prevent the entry fiber clip 22 from becoming unlocked or detached from the wall 34. The U-shaped fiber guide 200 includes a base wall 208, two side walls 212, 212', a catch 214 attached to an exterior surface of the side wall 212, an exterior edge 216, a peripheral groove 222 extending around a portion of the outside periphery of the base wall 208 and side walls 212, 212', and an interior edge 224. Preferably, the thicknesses of the walls 208, 212, 212' are approximately 0.080" (inches), which contribute to the rigidity of the entry fiber clip 22 and thus reduce any likelihood of it becoming unlocked or detached from the wall 34.

The catch 214 has a sloped upper surface 218 that starts near an edge of the side wall 212 and ends at a narrow, planar front surface 219. The sloped upper surface 218 and front surface 219 form a lip upon which the latch mechanism 234, described below, can catch to hold the door locking mechanism 230 in a closed position.

The exterior edge 216 has a notch 220 formed therein. When the entry fiber clip 22 is mounted on the edge of the wall 34, as described below, the exterior edge 216 is outside of the enclosure 14 and the interior edge 224 is inside of the enclosure 14.

The base wall 208 and side walls 212, 212' define an open-ended funnel-like basin for holding fiber optic cables passing through the entry fiber clip 22. The curvature of the funnel-like basin is designed such that any fiber optic cables following the curvature of the basin can bend without kinking or breaking.

Figure 9:
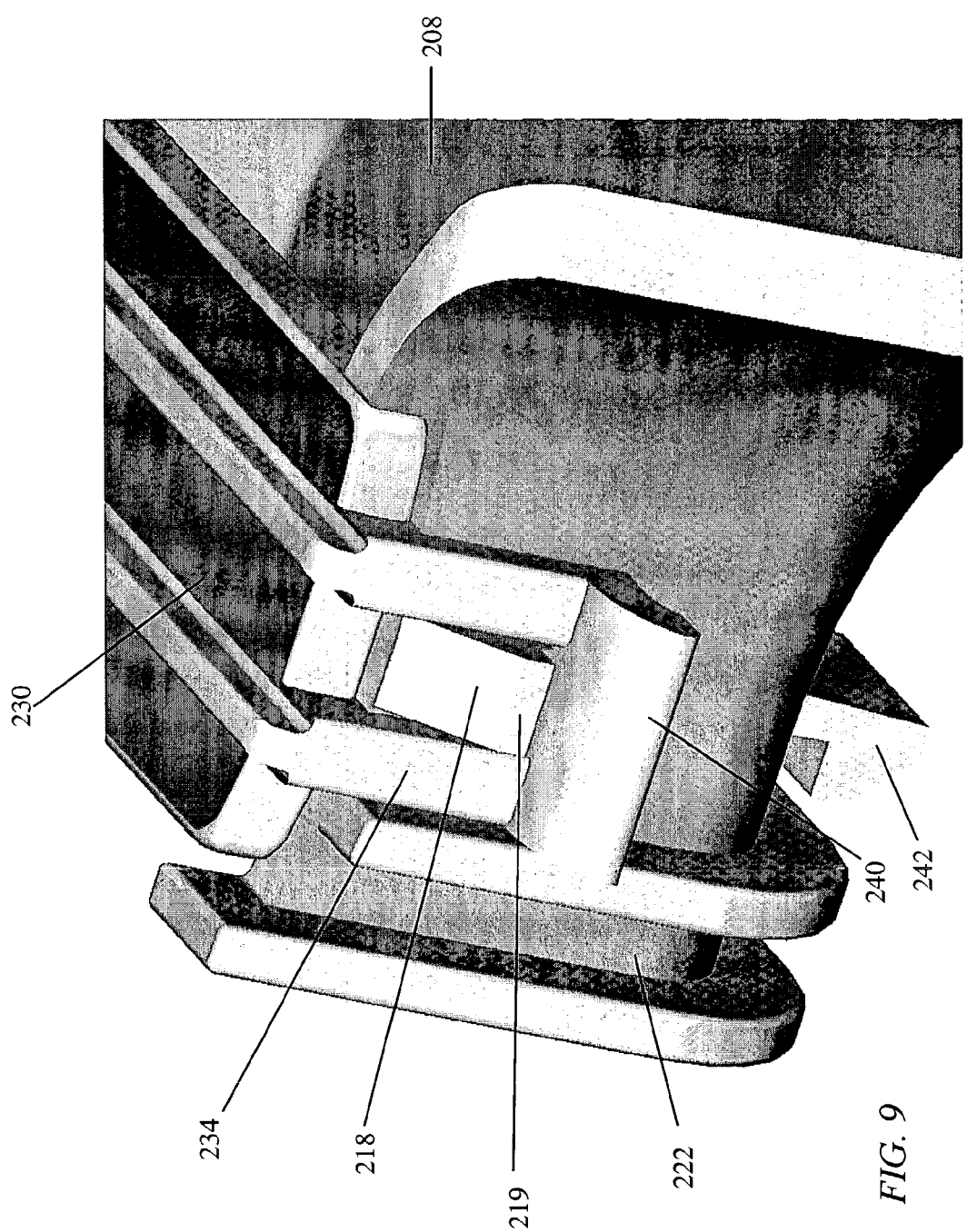
FIG. 9 is a view of the door locking mechanism engaging a catch of the fiber guide when in a closed position.

The door locking mechanism 204 includes a living hinge 226, a door 230, and a latch mechanism 234. The living hinge 226 connects one end of the door 230 to an exterior surface of the side wall 212' and enables rotation of the door 230 about an axis 242 between an open position (as shown in FIG. 8) and a closed position (as shown in FIG. 9). Connected to the other end of the door 230 is the latch mechanism 234 with an opening 238. The latch mechanism 234 extends substantially perpendicularly from the door 230 in the direction of a closing rotation (i.e., when rotating the door locking mechanism 204 from an open position to the closed position). In the embodiment shown, the opening 238 of the latch mechanism 234 is generally rectangular in shape, lies in a plane that is perpendicular to the plane of the door 230, and is sized to receive the front edge 220 and part of the sloped surface 218 of the catch 214 when the door locking mechanism 204 is rotated into the closed position. At a leading edge 239 of the latch mechanism 234 is a lever 240 for use by a user to open the entry fiber clip 22.

FIG. 9 shows in detail the door locking mechanism 204 in the closed position with the latch mechanism 234 engaging the catch 214 (FIG. 8) on the exterior surface of the side wall 212 of the fiber guide 200. More specifically, when the door locking mechanism 204 is rotated from the open position towards the closed position, the leading edge 239 of the latch mechanism 234 contacts the sloped upper surface 218 of the catch 214. An increase in closing pressure urges the latch mechanism 234 down the slope of the sloped upper surface 218. The resiliency of the latch mechanism 234 permits slight outward bending until the opening 238 of the latch mechanism 234 loops around the planar front surface 219 of the catch 214. At that point, the tension built in the latch mechanism 234 because of the outward bending snaps the latch mechanism 234 underneath the lip formed by the planar front surface 219. In this closed position the planar front surface 219 and part of the sloped upper surface 218 extend into the opening 238. Thus the door locking mechanism 204 becomes locked to the fiber guide portion 200. Further, the lip formed by the planar front surface 219 prevents the latch mechanism 234 from unintentionally unlocking. The lever 240 at the leading edge of the latch mechanism 234 gives a mechanism for the user to lift the latch mechanism 234 from around the lip to open the door 230.

Figure 10:
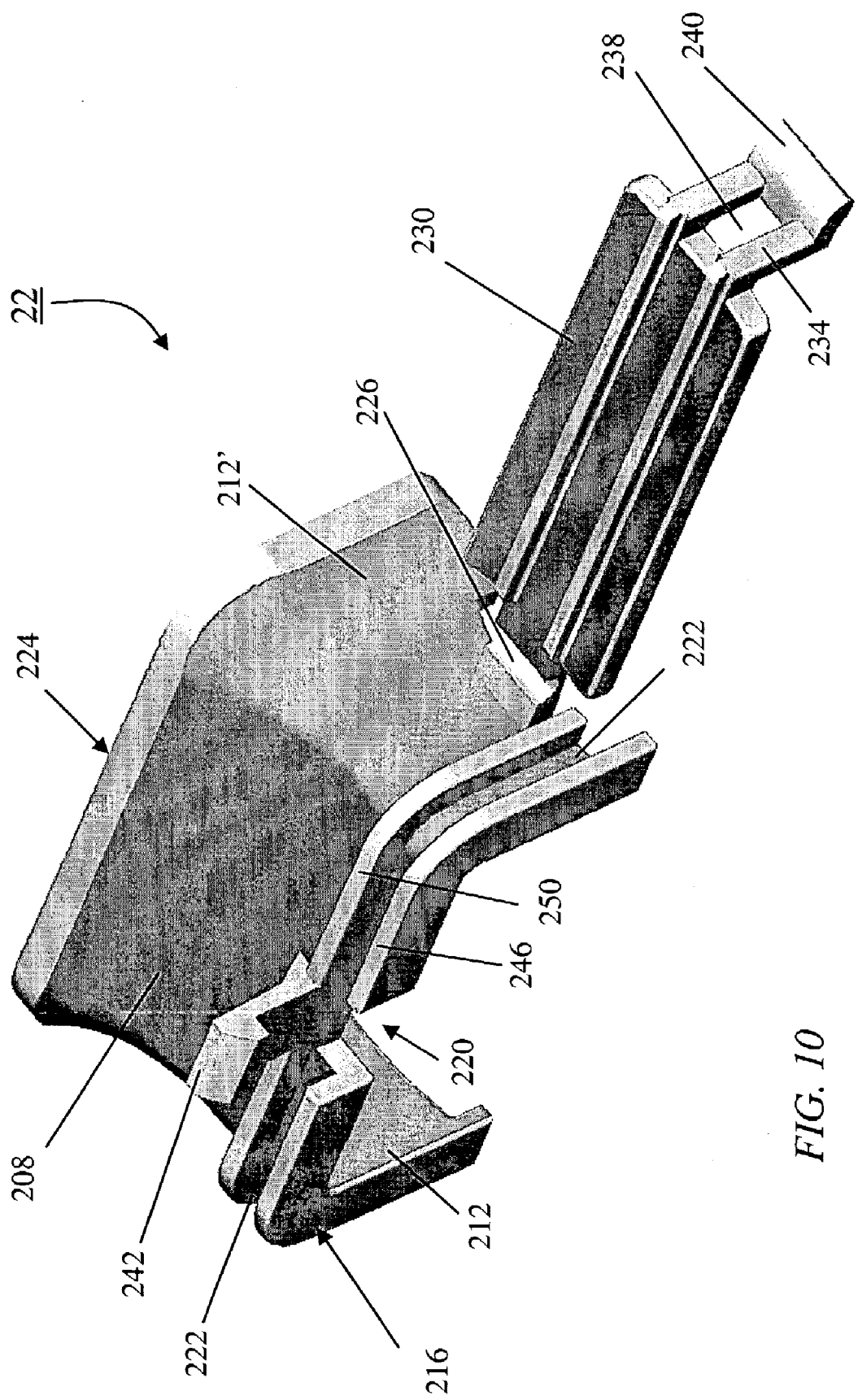
FIG. 10 is a view of a rear side of the entry fiber clip including a groove for receiving the edge of a wall of an enclosure and a plunger for entering an opening in the wall.

FIG. 10 shows an embodiment of a rear side of the entry fiber clip 22 with the groove 222 (FIG. 8) and a plunger 242. The rear side has two raised spaced-apart ribs 246, 250 near the exterior edge 216. The ribs 246, 250 run the full height of side walls 212, 212' and along the rear side of the base wall 208. The raised rib 246 is discontinuous at the notch 220. These raised ribs 246, 250 form the groove 222 that receives one or more edges of the wall 34 (FIG. 1) of the fiber management system 10. The spacing between the ribs 246, 250 corresponds with the thickness of the wall 34 to ensure that the groove 222 closely receives the wall edge(s).

Figure 11:
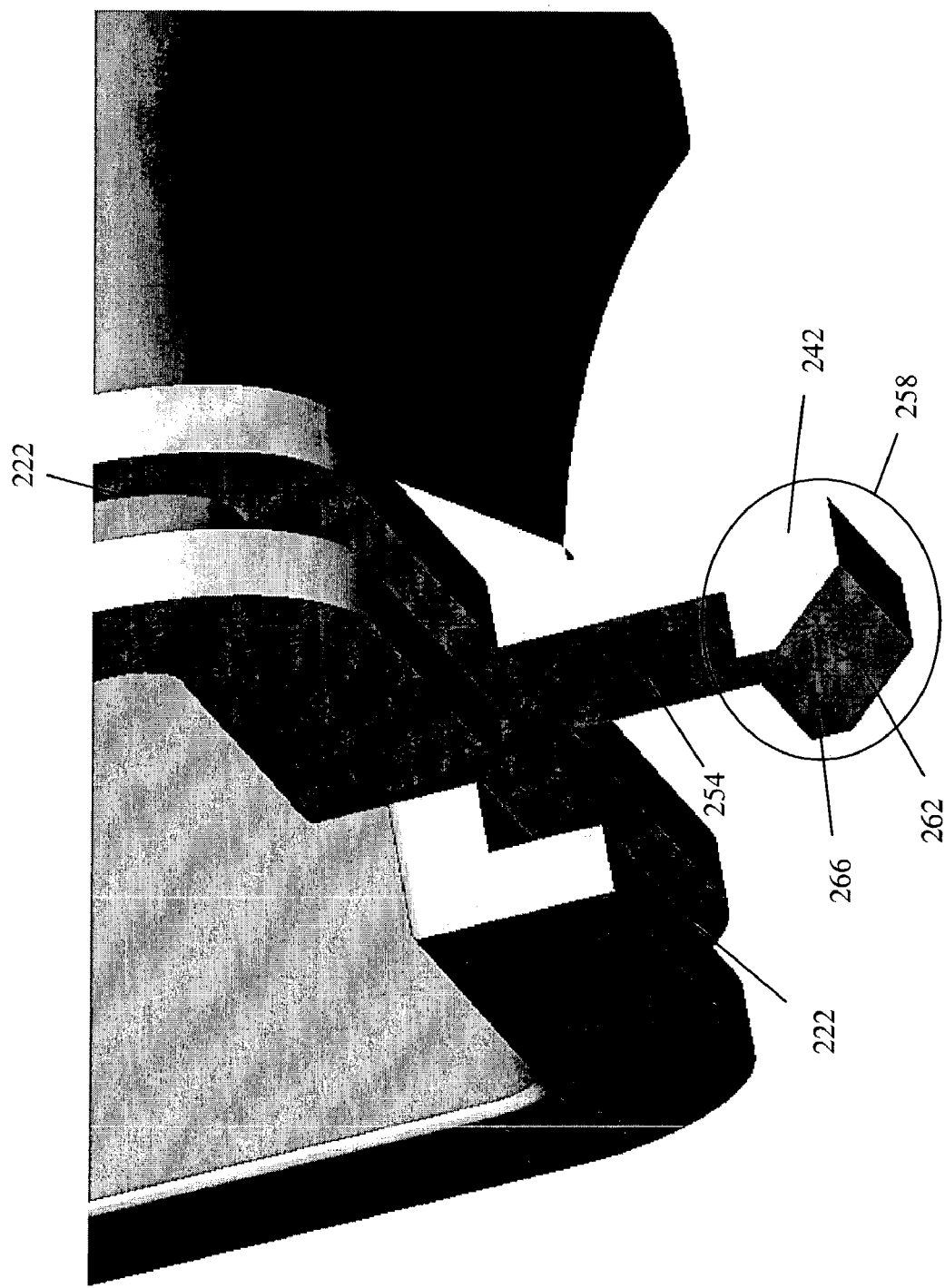
FIG. 11 is a view of the plunger of FIG. 10 in greater detail.

Aligned with the notch 220 is the plunger 242. The plunger 242 is connected to and extends away from the raised rib 250 substantially perpendicular to the rear side of the entry fiber clip 22. FIG. 11 shows an embodiment of the plunger 242 in closer detail having a shaft 254 and a hook 258. The hook 258 has a sloped surface 262 that ends at a planar front surface 266. The sloped surface 262 and planar front surface 266 form a lip that extends substantially perpendicular to the shaft 254 and overhangs the groove 222. Thus to slide the groove 222 over the edge of the wall 34 requires the shaft 254 and hook 258 to be slightly bent backwards away from the wall 34. When the hook 258 becomes aligned with an opening 270 in the wall 34 (see FIG. 12), the tension in the shaft 254 because of the bending causes the planar front surface 266 and sloped surface 262 of the hook 258 to snap into the opening 270, with the lip being pressed against an edge of the opening 270. Thus, the entry fiber clip 22 is attached to the wall 34 by means of the groove 222 and of the hook 258.

Figure 12:
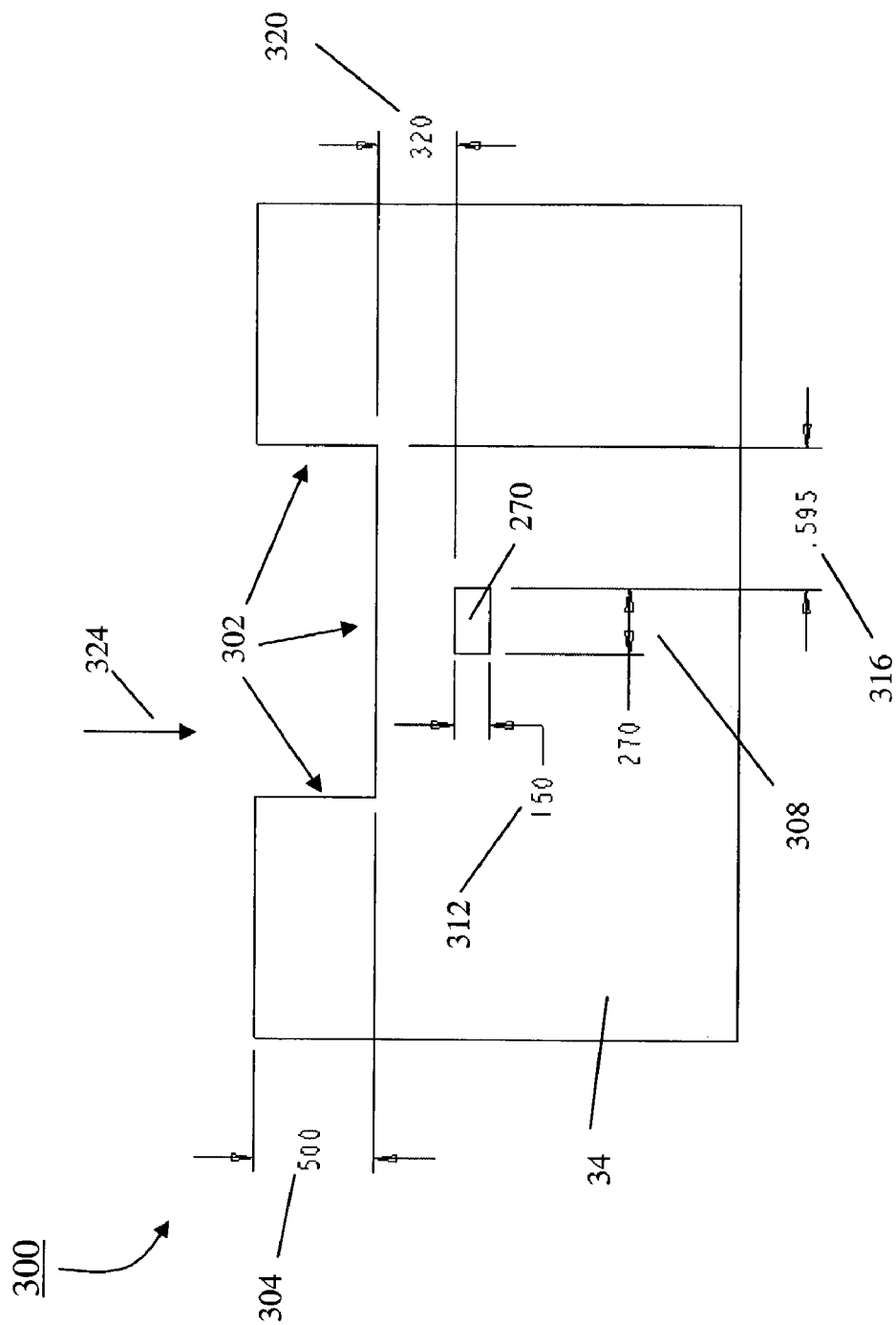
FIG. 12 is a schematic diagram of a cut-out for the wall of the enclosure, including measurements for dimensions of an opening in the wall for receiving the entry fiber clip of the invention.

FIG. 12 shows a schematic of a cut-out 300 in the wall 34 for enabling the attachment of one entry fiber clip 22 to the wall 34. The schematic provides various dimensions 304, 308, 312, 316, and 320 corresponding to the relative locations and sizes of a notch 302 and of the opening 270 in the wall 34. Shown values for the dimensions are in inches.

The notch 302 has three edges that slide into the groove 222 of the entry fiber clip 22. The entry fiber clip 22 is inserted into the notch 302 along a direction indicated by the arrow 324. The side wall edges of the notch 302 limit the amount of up and down movement of the attached entry fiber clip 22 along the vertical edge of the wall 34. The plunger 342 limits the amount of up lateral movement, and the groove 222 and plunger 342 together limit the amount of front to back movement.

The dimension 304 corresponds to a height of the notch 302, which is approximately the height of the side wall 212, 212' of the entry fiber clip 22; the dimensions 308, 312 correspond, respectively, to the width and height of the opening 270 for closely receiving the hook 358 (FIG. 11) of the plunger 342 (FIG. 11); the dimension 316 corresponds to the distance of an edge of the opening 270 to an edge of the notch 302; and the dimension 320 corresponds to the distance of a top edge of the opening 270 to the edge of the notch 302.

Figure 13:
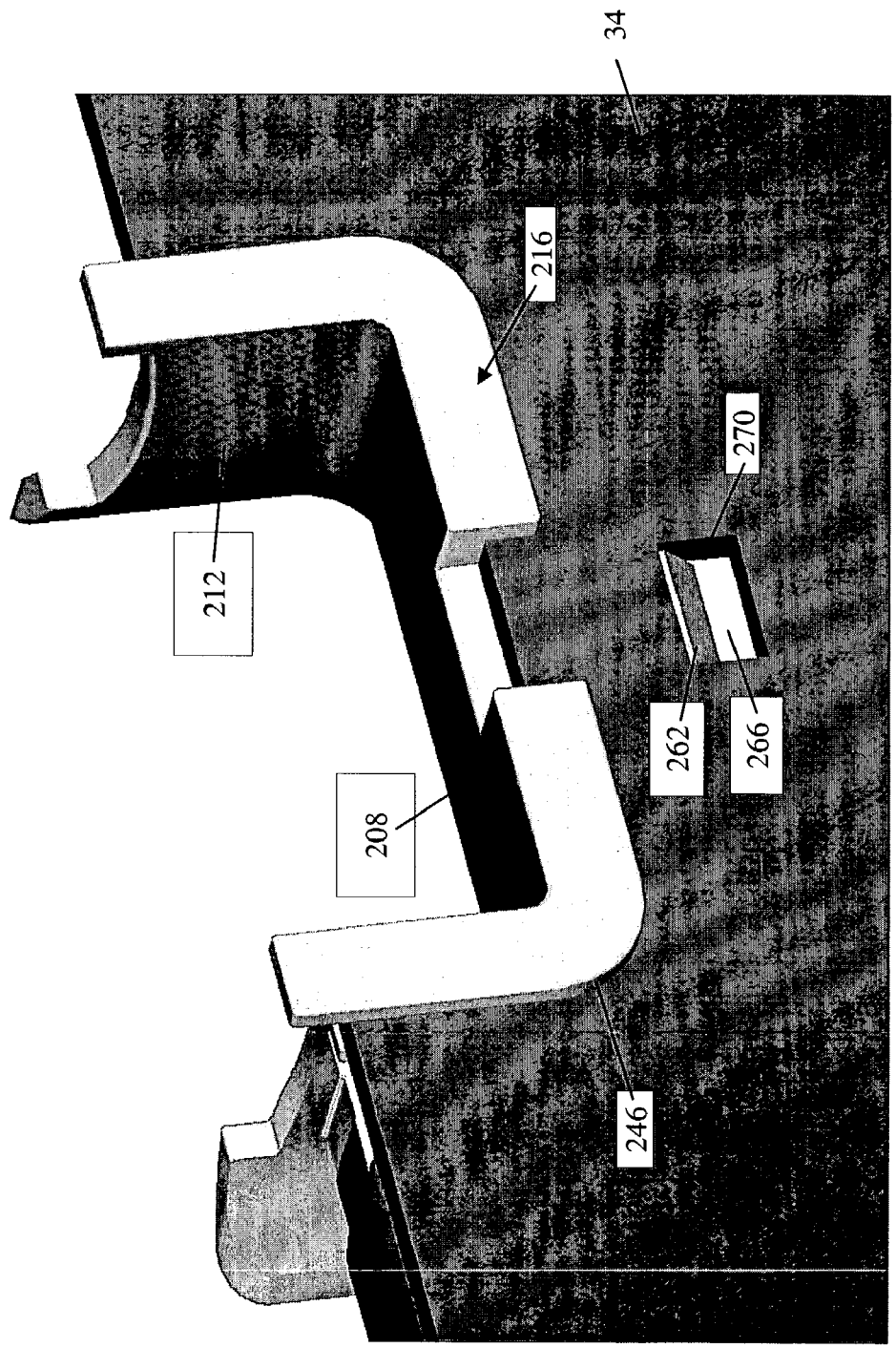
FIG. 13 is a view of one entry fiber clip attached to the edge of the wall in accordance with the principles of the invention.
Figure 14:
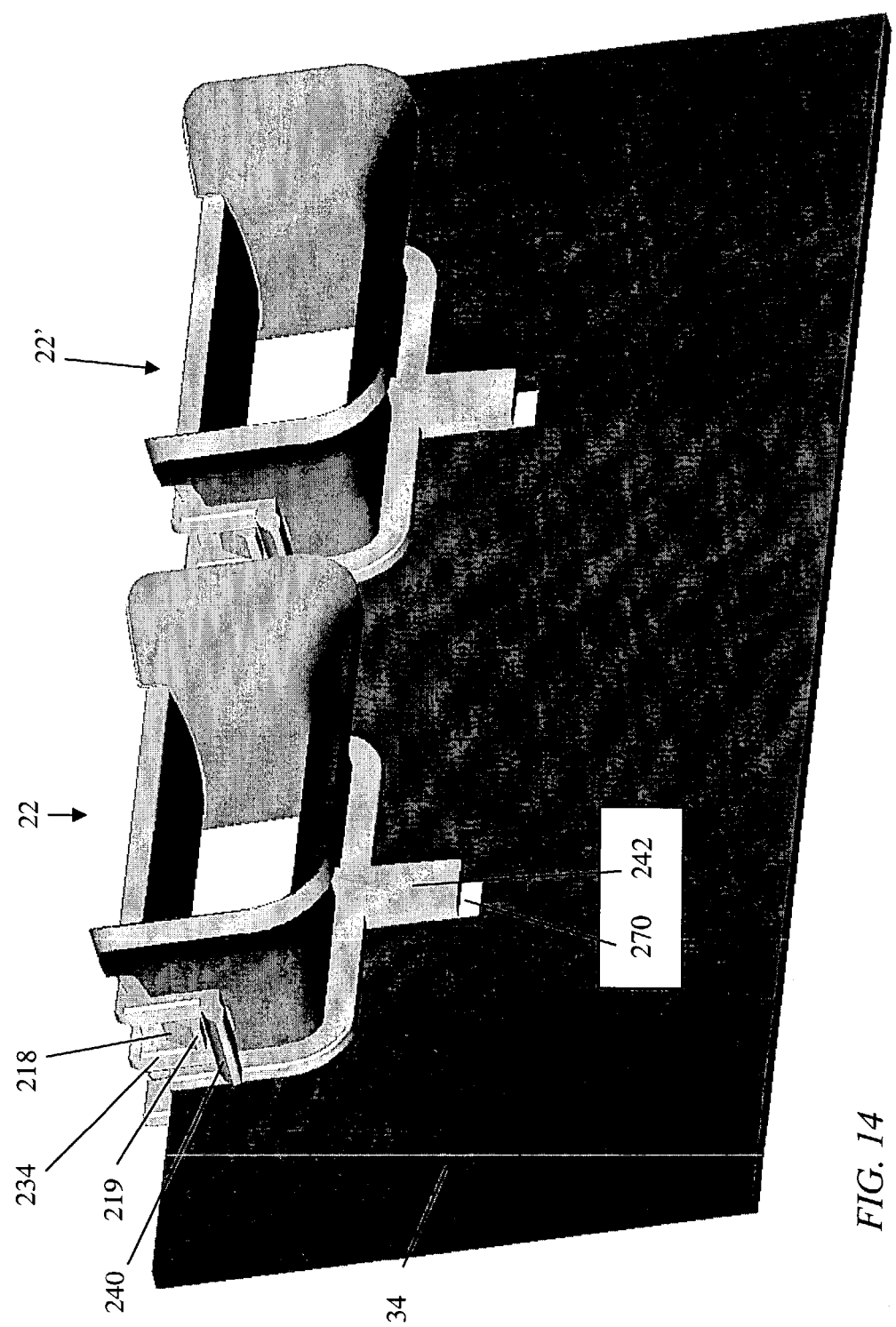
FIG. 14 is a view of a plurality of entry fiber clips attached to the edge of the wall in accordance with the principles of the invention.

FIG. 13 shows a portion of the entry fiber clip 22 attached at the edge of the side wall 34 of the enclosure 14 (FIG. 2). The edge of the wall 34 slides into the groove 222 and the hook 258 (i.e., the front surface 262 and part of the sloped surface 266) of the plunger 242 enters and locks into an appropriately sized and positioned opening 270 in the wall 34. FIG. 14 shows a plurality of closed entry fiber clips 22, 22' attached at the edge of the side wall 34 of the enclosure 14 (FIG. 2). Typically, the enclosure wall 34 has a column of more fiber clips than those shown.

While the invention has been shown and described with reference to specific preferred embodiments, it should be understood by those skilled in the art that various changes in form and detail may be made therein without departing from the spirit and scope of the invention as defined by the following claims.

What is claimed is:

1. A fiber management system having an enclosure, comprising:
   an internal fiber clip including a fiber guide portion for bundling a plurality of fiber optic cables and a locking mechanism connected to one end of the fiber guide portion for attaching the internal fiber clip to a first wall of the enclosure, the locking mechanism having a stem and a resilient fin extending laterally away from the stem, the stem having a tab near one end of the stem and extending laterally away from the stem, the tab being spatially separated from an end of the resilient fin such that i) the end of the resilient fin presses against a first side of the first wall when the tab is fully inserted through a first opening in the first wall and ii) the tab is urged against an opposite side of the first wall when the internal fiber clip is rotated while the tab is fully inserted and the end of the resilient fin is pressing against a first side of the first wall; and
   an entry fiber clip attached to an edge of an external wall of the enclosure for guiding at least one of the plurality of fiber optic cables bundled by the internal fiber clip to a telecommunications system external to the enclosure, the entry fiber clip including an entry fiber guide portion having first and second spaced-apart side walls and a base portion, the entry fiber guide portion having a plunger extending substantially perpendicularly away from an exterior side of the base portion, the plunger having a shaft and a hook at the end of the shaft for latching onto a back edge of an opening in the external wall of the enclosure when attaching the entry fiber clip to the external wall.

2. The fiber management system of claim 1, wherein the resilient fin has a pin ball at the end thereof that enters a second opening in the first wall when the internal fiber clip is rotated with the tab fully inserted through the first opening in the first wall.

3. The fiber management system of claim 1, wherein the tab extends away from the stem in a lateral direction that is approximately at a right angle with a lateral direction in which the resilient fin extends away from the stem.

4. The fiber management system of claim 1, wherein the entry fiber clip includes:
   an entry fiber guide portion having first and second spaced-apart side walls and a base portion, the first side wall having a catch on an outer surface thereof, the catch having a sloped surface and a front surface that define a lip; and
   a door locking mechanism having a door with a first end and a second end, the door being connected at the first end to a latch mechanism having an opening formed therein, the opening lying in a plane that is substantially perpendicular to a plane of the door, the door being rotatably connected at the second end to the second side wall for rotational movement about an axis between an open position and a closed position, the opening of the latch mechanism receiving the lip of the catch when the door is rotated into the closed position.

5. The entry fiber clip of claim 4, wherein the entry fiber guide portion has an exterior side with a plurality of ribs formed thereon, the plurality of ribs defining a groove that closely receives the edge of the external wall of the enclosure when the entry fiber clip is attached to the external wall.

6. The entry fiber clip of claim 1, wherein the entry fiber guide portion has an exterior side with a plurality of ribs formed thereon, the plurality of ribs defining a groove that closely receives the edge of the external wall of the enclosure when the entry fiber clip is attached to the external wall.

7. A fiber management system having an enclosure, comprising:
   an internal fiber clip for segregating a plurality of fiber optic cables from other fiber optic cables in the enclosure; and
   an entry fiber clip attached to an edge of an external wall of the enclosure for guiding at least one of the plurality of fiber optic cables segregated by the internal fiber clip to a telecommunications system external to the enclosure, the entry fiber clip including:
      a fiber guide portion having first and second spaced-apart side walls and a base portion, the first side wall having a catch on an outer surface thereof, the catch having a sloped surface and a front surface that define a lip, the fiber guide portion including a plunger extending substantially perpendicularly away from an exterior side of the base portion, the plunger having a shaft and a hook at the end of the shaft for latching onto a back edge of an opening in the external wall of the enclosure when attaching the entry fiber clip to the external wall; and
      a door locking mechanism having a door with a first end and a second end, the door being connected at the first end to a latch mechanism having an opening formed therein, the opening lying in a plane that is substantially perpendicular to a plane of the door, the door being rotatably connected at the second end to the second side wall for rotational movement about an axis between an open position and a closed position, the opening of the latch mechanism receiving the lip of the catch when the door is rotated into the closed position.

8. The entry fiber clip of claim 7, wherein the fiber guide portion has an exterior side with a plurality of ribs formed thereon, the plurality of ribs defining a groove that closely receives the edge of the external wall of the enclosure when the entry fiber clip is attached to the external wall.

9. A fiber management system having an enclosure, comprising:
   an internal fiber clip for segregating a plurality of fiber optic cables from other fiber optic cables in the enclosure; and
   an entry fiber clip guiding at least one of the plurality of fiber optic cables segregated by the internal fiber clip to a telecommunications system external to the enclosure, the entry fiber clip including a fiber guide portion having first and second spaced-apart side walls and a base portion, the fiber guide portion having a plunger extending substantially perpendicularly away from an exterior side of the base portion, the plunger having a shaft for entering into an opening in an external wall of the enclosure and a hook at the end of the shaft for latching onto a back edge of the opening to attach the entry fiber clip to the external wall, wherein the fiber guide portion has an exterior side with a plurality of ribs formed thereon, the plurality of ribs defining a groove that closely receives an edge of the external wall of the enclosure when the entry fiber clip is attached to the external wall.

10. An entry fiber clip for guiding fiber optic cable between an enclosure and a telecommunications system, the entry fiber clip comprising:
   a fiber guide portion having first and second spaced-apart side walls and a base portion, the first side wall having a catch on an outer surface thereof, the catch having a sloped surface and a front surface that define a lip, the fiber guide portion having a plunger extending substantially perpendicularly away from an exterior side of the base portion, the plunger having a shaft and a hook at the end of the shaft for latching onto an edge of an appropriately sized opening in an external wall of the enclosure when attaching the entry fiber clip to the external wall; and
   a door locking mechanism having a door with a first end and a second end, the door being connected at the first end to a latch mechanism having an opening formed therein, the opening lying in a plane that is substantially perpendicular to a plane of the door, the door being rotatably connected at the second end to the second side wall for rotational movement about an axis between an open position and a closed position, the opening of the latch mechanism receiving the lip of the catch when the door is rotated into the closed position.

11. The entry fiber clip of claim 10, wherein the fiber guide portion has an exterior side with a plurality of ribs formed thereon, the plurality of ribs defining a groove that closely receives an edge of the external wall of the enclosure when the entry fiber clip is attached to the external wall.

12. An entry fiber clip for guiding optical fiber cable in an optical fiber management system, comprising:
   a fiber guide portion having first and second spaced-apart side walls and a base portion, the fiber guide portion having a plunger extending substantially perpendicularly away from an exterior side of the base portion, the plunger having a shaft and a hook at the end of the shaft for latching onto a back edge of an opening in an external wall of the enclosure when attaching the entry fiber clip to the external wall, the fiber guide portion having an exterior side with a plurality of ribs formed thereon, the plurality of ribs defining a groove that closely receives an edge of the external wall of the enclosure when the entry fiber clip is attached to the external wall.

13. A fiber clip, comprising:
   a fiber guide portion having first and second spaced-apart sidewalk and a base portion, the first sidewall having a catch on an outer surface thereof, the catch having a sloped surface and a front surface that define a lip, the fiber guide portion having a plunger extending substantially perpendicularly away from an exterior side of the base portion, the plunger having a shaft and a hook at the end of the shaft for latching onto a back edge of an opening in a wall of an enclosure when attaching the entry fiber clip to the wall; and
   a door locking mechanism having a door with a first end and a second end, the door having a latch mechanism at the first end with an opening formed therein, the opening lying in a plane that is substantially perpendicular to a plane of the door, the door being connected at the second end to the second sidewall for rotational movement about an axis between an open position and a closed position, the opening of the latch mechanism latching onto the lip of the catch when the door is rotated into the closed position.

14. The fiber clip of claim 13, further comprising means, coupled to the latch mechanism, for disengaging the latch mechanism from the catch.

15. The fiber clip of claim 13, wherein the fiber guide portion has an exterior side with a plurality of ribs formed thereon, the plurality of ribs defining a groove that closely receives an edge of a wall of an enclosure when the fiber clip is attached to the wall.

* * * * *